United States Patent [19]

Takehara et al.

[11] Patent Number: 5,088,761
[45] Date of Patent: Feb. 18, 1992

[54] VEHICLE SUSPENSION SYSTEM

[75] Inventors: Shin Takehara; Toshiki Morita, both of Higashi-Hiroshima, Japan

[73] Assignee: Mazda Motor Corporation, Hiroshima, Japan

[21] Appl. No.: 522,781

[22] Filed: May 14, 1990

[30] Foreign Application Priority Data

May 17, 1989 [JP] Japan .................. 1-124064

[51] Int. Cl.⁵ .................................... B60G 11/26
[52] U.S. Cl. .................... 280/707; 280/840; 280/6.g33; 364/424.05
[58] Field of Search ............ 280/840, 6.1, 702, 703, 280/707, 709; 307/10.1; 364/424.05; 188/299

[56] References Cited

U.S. PATENT DOCUMENTS

| | | | |
|---|---|---|---|
| 4,371,182 | 2/1983 | Brown | 280/61 |
| 4,787,644 | 11/1988 | Yokote et al. | 280/707 |
| 4,787,649 | 11/1988 | Watanabe et al. | 280/707 |

FOREIGN PATENT DOCUMENTS

| | | |
|---|---|---|
| 0106697 | 4/1984 | European Pat. Off. . |
| 0114757 | 8/1984 | European Pat. Off. . |
| 0220658 | 5/1987 | European Pat. Off. . |
| 0220674 | 5/1987 | European Pat. Off. . |
| 0337797 | 10/1989 | European Pat. Off. . |
| 62-96113 | 5/1987 | Japan . |

*Primary Examiner*—Kenneth R. Rice
*Attorney, Agent, or Firm*—Fleit, Jacobson, Cohn, Price, Holman & Stern

[57] ABSTRACT

A vehicle suspension system includes a cylinder device, provided between a vehicle body member and a vehicle wheel member for the vehicle body member, in which suspension characteristics are changed by controlling hydraulic fluid supply for the cylinder device. A vehicle height displacement detecting device detects a vehicle height displacement, and a vehicle height control device receives a signal from the vehicle height displacement detecting device to control the hydraulic fluid supply for the cylinder device to thereby obtain a target vehicle height displacement in accordance with a height control sensitivity. A sensitivity change device changes the height control sensitivity in accordance with a predetermined condition so as to change the supply of the hydraulic fluid for the cylinder device. A warp control cooperate and a height control are optimized.

6 Claims, 8 Drawing Sheets

VEHICLE SUSPENSION SYSTEM

BACKGROUND OF THE INVENTION

1. Field of the Invention

This invention relates to a suspension system for a vehicle, and in particular, to an active suspension system.

2. Description of Related Art

A conventional active suspension is disclosed in, for example, Japanese Patent Publication No. 62-96113, laid open to the public on May 2, 1987, a European Patent Application, laid open to the public on Aug. 1, 1984 under a publication number 0114757, and U.S. Pat. No. 4,371,182 issued on Feb. 1, 1983. In the active suspensions as disclosed in the publications referred to above, a cylinder device is provided for each vehicle wheel member between a vehicle body member and a vehicle wheel member. By controlling a supply of the hydraulic fluid for the cylinder device, the hydraulic fluid in the cylinder device can be changed so that the vehicle suspension characteristics are changed.

In the active suspension system, a hydraulic pressure is detected and a warping of the vehicle body is computed based on the hydraulic pressure detected. A warp control is accomplished by controlling a hydraulic fluid supply for the cylinder device.

In addition, a vehicle height displacement is detected and a supply of the hydraulic fluid is controlled for the cylinder device to get a target value of the vehicle height displacement (a vehicle height displacement control).

The warp control and the vehicle height displacement control are carried out independently. Therefore, both of the controls must be coordinated with each other for improving the suspension property.

SUMMARY OF THE INVENTION

An object Of the invention is, therefore, to provide a vehicle suspension system in which both the warp control and the vehicle height displacement control are optimally coordinated with each other to accomplish an improved riding comfort.

Another object of the present invention is to provide a responsive active suspension system for the vehicle.

The above objects of the invention can be accomplished by a vehicle suspension system comprising a cylinder device, provided between a vehicle body member and a vehicle wheel member for the vehicle body member, in which suspension characteristics are changed by controlling hydraulic fluid supply for the cylinder device. Vehicle height displacement detecting means are provided for detecting a vehicle height displacement, vehicle height control means are provided for receiving a signal from the vehicle height displacement detecting means to control the hydraulic fluid supply for the cylinder device to thereby obtain a target vehicle height displacement in accordance with a height control sensitivity, and sensitivity change means are provided for changing the height control sensitivity in accordance with a predetermined condition so as to change the supply of the hydraulic fluid for the cylinder device.

According to the present invention, the sensitivity change means changes the height control sensitivity of the height control means in accordance with a predetermined condition so as to change the supply of the hydraulic fluid for the cylinder device. Thus, both the warp control and the vehicle height displacement control are coordinated to be optimized under the predetermined condition.

The height control sensitivity denotes, for example, a gain coefficient of the vehicle height displacement and a dead zone in a vehicle height displacement signal of the vehicle height displacement detecting means. When the gain coefficient of the vehicle height displacement is increased or when the dead zone is reduced, the height control sensitivity is increased. However, when the gain coefficient is decreased or when the dead zone is increased, the height control sensitivity is reduced.

According to one of the feature of the present invention, the warp control can be emphasized in comparison with the vehicle height displacemennt control by reducing the height control sensitivity under a predetermined condition in which a vehicle speed is increased, a lateral acceleration of the vehicle is increased, or the vehicle is in a parking condition.

In another aspect of the present invention, a height change rate control sensitivity can be increased as the height control sensitivity is reduced.

The height change rate control sensitivity denotes, for example, a gain coefficient of a vehicle height displacement change rate or a dead zone in a signal of the vehicle height displacement change rate detected or computed based on the vehicle height displacement detecting means.

When the gain coefficient of the vehicle height displacement change rate is increased, or when the dead zone in the signal from the vehicle height displacement detecting means is reduced, the height change rate control sensitivity is increased.

DESCRIPTION OF THE PREFERRED EMBODIMENT

Figure 1:
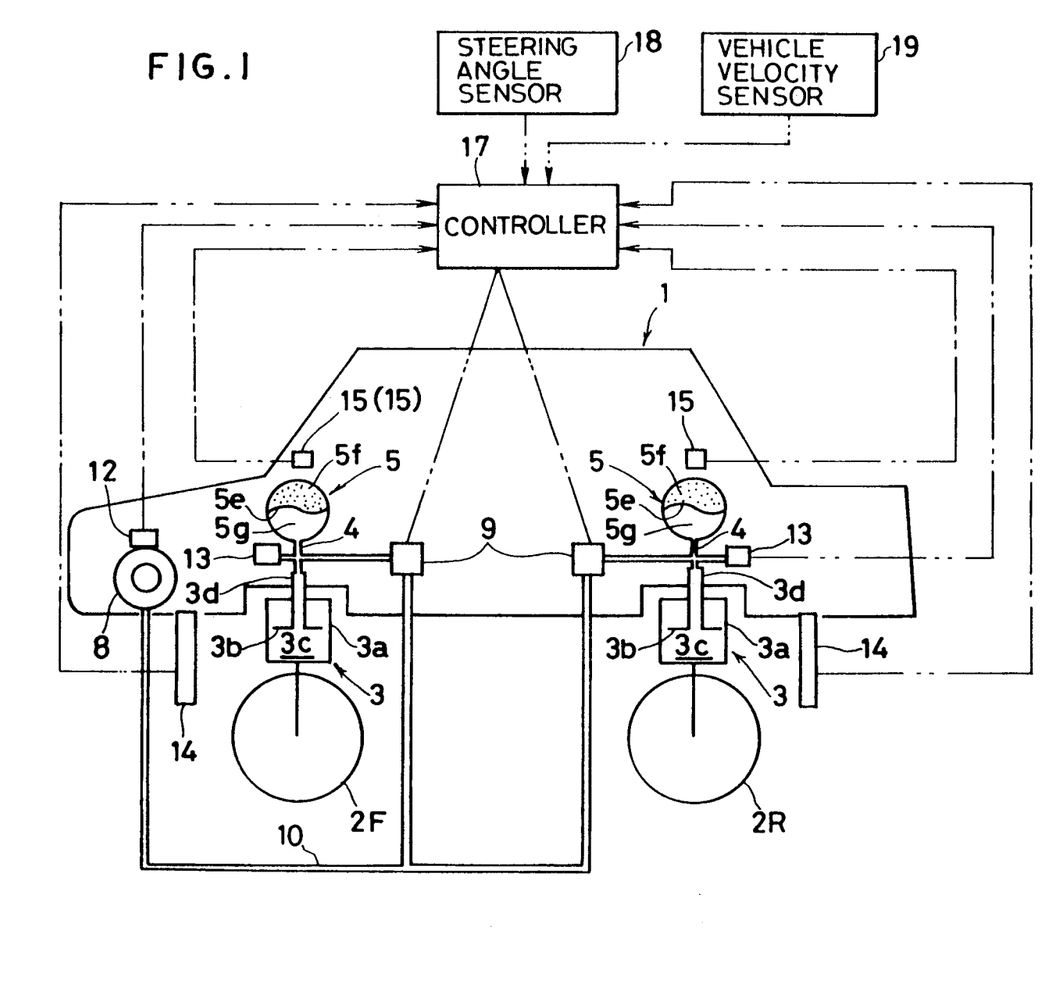
FIG. 1 is an overall schematic view of a vehicle.

FIG. 1 is an overall schematic view of a vehicle according to the invention. In FIG. 1, numeral 1 designates a vehicle body member or a vehicle body, and 2F and 2R respectively designate front and rear vehicle wheel members. Between vehicle body 1 and front wheels 2F, and between vehicle body 1 and rear wheels 2R are provided hydraulic cylinders 3, 3. A piston 3b inserted into each cylinder body 3a defines a fluid pressure chamber 3c inside each hydraulic cylinder 3. The upper end portion of a rod 3d connected to the piston 3b is connected to the vehicle body 1, and cylinder bodies 3a, 3a are connected to vehicle wheels 2F, 2R respectively.

A gas spring 5 is connected to the fluid pressure chamber 3c of each hydraulic cylinder 3 through a communicating path 4. Each gas spring 5 is divided into a gas chamber 5f and a fluid pressure chamber 5g by a diaphragm 5, and the fluid pressure room 5g is connected to the fluid pressure chamber 3c of the hydraulic cylinder 3 through the communicating path 4 and the piston 3b of the hydraulic cylinder 3.

Numeral 8 designates a hydraulic pump, and numerals 9, 9 designate proportional flow control valves connected to the hydraulic pump 8 through a fluid pressure path 10. These valves function to control fluid supply for the hydraulic cylinders 3, 3.

Numeral 12 designates a discharge pressure gauge which senses the discharge pressure of the hydraulic pump 8, and numerals 13, 13 designate fluid pressure sensors which sense the fluid pressure of the fluid pressure chambers 3c in the hydraulic cylinders 3, 3. Numerals 14, 14 designate vehicle height sensors which sense the vehicle height displacement (cylinder stroke length), and numerals 15, 15, 15 designate vertical acceleration sensors which sense the vertical acceleration of the vehicle (spring acceleration of the wheels 2F, 2R). One of these vertical acceleration sensors 15, 15, 15 is provided above each of the right and left front wheels 2F within an approximately horizontal plane, and one is also provided at the center of the vehicle in the widthwise direction between the rear wheels 2R. A total of three vertical acceleration sensors are provided.

Numerals 18, 19 designate a steering angle sensor and a vehicle speed sensor, respectively.

The signals from the above mentioned sensors are input to a controller 17 constituted of CPU (central processing unit) and the like, which controls the proportional flow control valves 9, 9 so as to change the suspension characteristics.

Figure 2:
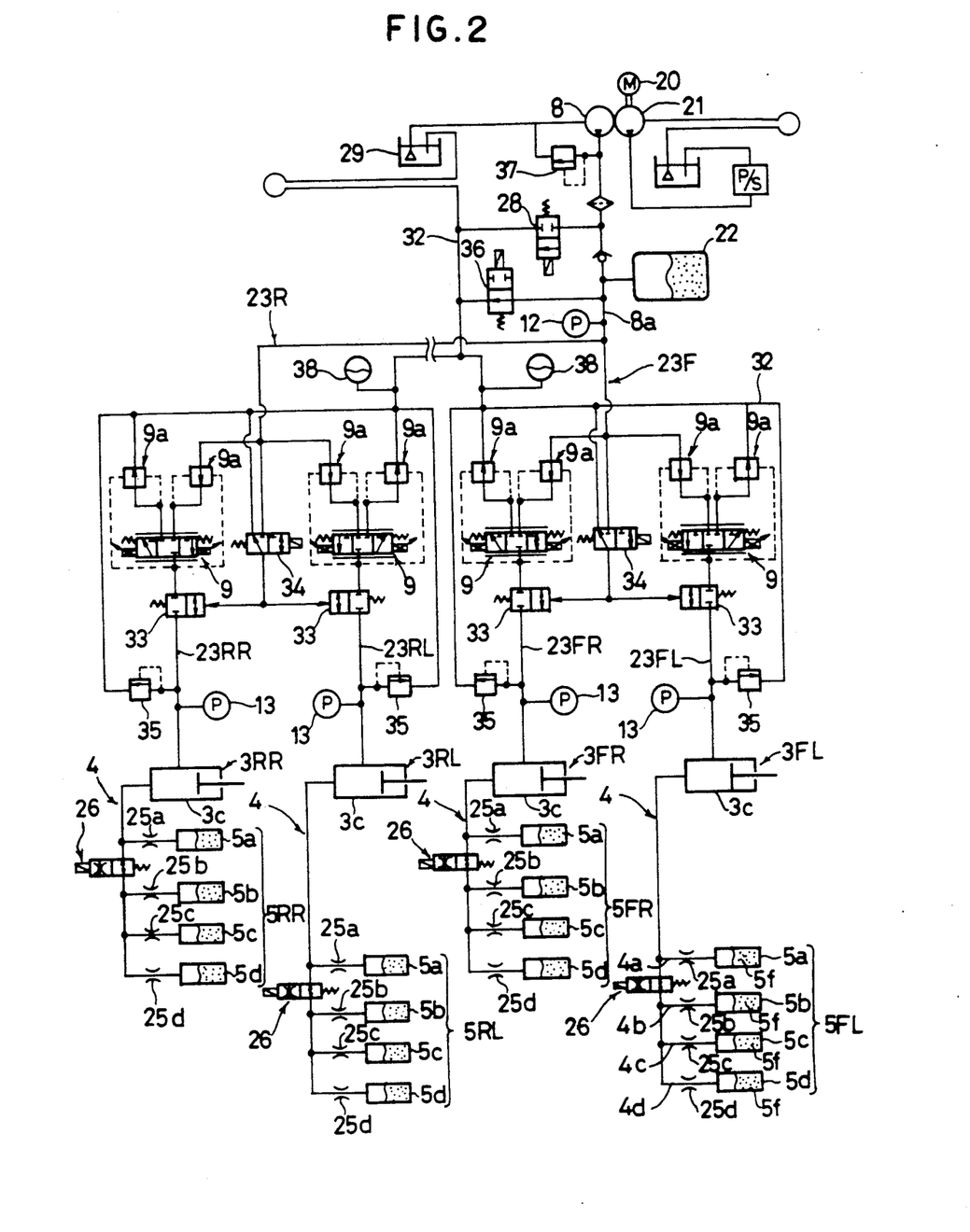
FIG. 2 is a circuit diagram of a hydraulic system for controlling fluid supply for hydraulic cylinder devices.

FIG. 2 shows a hydraulic circuit for supplying and discharging hydraulic fluid for the hydraulic cylinders 3.

As seen in FIG. 2, the hydraulic pump 8 is connected in tandem with a hydraulic pump 21 driven by a driving motor 20 for a power steering device. A discharge tube 8a has an accumulator 22 connected with an intermediate portion thereof and a downstream portion of the discharge tube 8a branches off into a front wheel tube 23F and a rear wheel tube 23R. The front wheel tube 23F branches off into a left front wheel tube 23FL and a right front wheel tube 23FR, the downstream ends Of which are connected with the fluid pressure chambers 3c, 3c of the hydraulic cylinders 3FL, 3FR.

Likewise, the rear wheel tube 23R branches off into a left wheel tube 23RL and a right wheel tube 23RR, the downstream ends of which are connected with the fluid pressure chambers 3c, 3c of the hydraulic cylinders 3RL, 3RR.

The gas spring devices 5FL through 5RR, connected with the hydraulic cylinders 3FL through 3RR, each has a plurality (four) of gas springs 5a, 5b, 5c, 5d, which are connected through branch communicating paths 4a through 4d to a common communicating path 4 connected with the fluid pressure chamber 3c of the corresponding hydraulic cylinder 3. The branch communicating paths 4a through 4d of the plurality (first through fourth) gas springs 5a through 5d of each wheel have orifices 25a through 25d. The damping action by the orifices 25a through 25d and the buffer action of gas charged in the gas chambers 5f are combined to provide the basic function as a suspension system.

In the gas springs 5FL through 5RR of each vehicle wheel, a damping force switching valve 26, which switches the damping force by adjusting the path area of the communicating path 4, is provided on the common communicating path 4 between the first gas spring 5a and the second gas spring gas spring 5b. The switching valve 26 has two positions: an open position (shown in FIG. 2) opening the common communicating path 4 and a throttle position throttling the area of the common communicating path 4.

The discharge tube 8a of the hydraulic pump 8 has an unloader relief valve 28 with an open position and a closed position (shown in FIG. 2) connected near the accumulator 22. When the discharged fluid pressure measured by the discharge pressure gauge 12 is more than or equal to a preset upper limit value, the relief valve 28 is switched from the closed position shown in FIG. 2 to the open position, so the fluid in the hydraulic pump 8 is returned directly to a reserve tank 29, whereby the fluid accumulation pressure in the accumulator 22 is maintained at a preset value. In the above mentioned manner, the accumulated fluid of preset pressure from the accumulator 22 is supplied to the hydraulic cylinders 3.

As the left front wheel, the right front wheel, the left rear wheel and the right rear wheel are identical in configurations, only the left front wheel will be described in the following.

As explained above, the left front wheel tube 23FL is provided with the proportional flow control valve 9 which has three positions: a stopping position closing all ports (shown in FIG. 2), a supplying position where the left front wheel tube 23FL is opened to the supplying side, and a discharge portion where the hydraulic cylinder 3 of the left front wheel tube 23FL is connected through a return tube 32. The proportional flow control valve 9 is further provided with pressure-compensated valves 9a, 9a. The pressure-compensated valves 9a, 9a maintain the fluid pressure in the fluid pressure chamber 3c at a preset valve when the proportional flow control valve 9 is positioned at either the supplying position or the discharge position.

On the hydraulic cylinder 3 side portion of the proportional flow control valve 9 is provided a pilot pressure active type switching valve 33 which opens and closes the left front tube 23FL. When a solenoid controlled valve 34, which introduces the pressurized fluid in the left front wheel tube 23F, is in the open position, the fluid pressure of the solenoid controlled valve 34 is introduced as a pilot pressure to the switching valve 34. When the pilot pressure is more than or equal to a predetermined value, the switching valve 33 operates to open the left front wheel tube 23FL, so that the proportional flow control valve 9 can control the flow to the hydraulic cylinder 3.

The numeral 35 designates a relief valve which opens and operates to return the hydraulic fluid in the fluid pressure chamber 3c of the hydraulic cylinder 3 to the return tube 32 when the fluid pressure of the fluid pressure chamber 3c rises abnormally. The numeral 36 designates an ignition switch interlock valve connected near the accumulator 22 on the discharge tube 8a of the hydraulic pump 8. When the ignition switch is at off position, the interlock valve 36 is controlled to open (shown in FIG. 2) so as to return the fluid in the accumulator 22 to the tank 29 and relieve the high pressure condition of the fluid. The numeral 37 designates a relief valve which returns fluid to the tank 29 and lowers the fluid pressure when the discharge pressure of the hydraulic pump 8 rises abnormally. The numerals 38, 38 designate return accumulators connected to the return tube 32 for accumulating the fluid discharged from the hydraulic cylinder 3.

FIG. 3 is a block diagram illustrating control of suspension characteristics by a controller 17.

FIG. 3 shows a control system A for controlling the vehicle height to a desired value based on vehicle height displacement signals $X_{FR}$, $X_{FL}$, $X_{RR}$, $X_{RL}$ from the vehicle height sensors 14, 14, 14, 14 of the vehicle wheels, a control system B for suppressing vehicle height displacement rates based on the vehicle height displacement rate signals $Y_{FR}$, $Y_{FL}$, $Y_{RR}$, $Y_{RL}$ obtained from the vehicle height displacement signals, a control system C for lowering vertical vibration of the vehicle based on vertical acceleration signals $G_{FR}$, $G_{FL}$, $G_R$ of the three vertical acceleration sensors 15, 15, 15, and a control system D for supressing vehicle body warping computed from pressure signals $P_{FR}$, $P_{FL}$, $P_{RR}$, $P_{RL}$ of the fluid pressure sensors 13, 13, 13, 13 of the vehicle wheels.

Figure 3A:
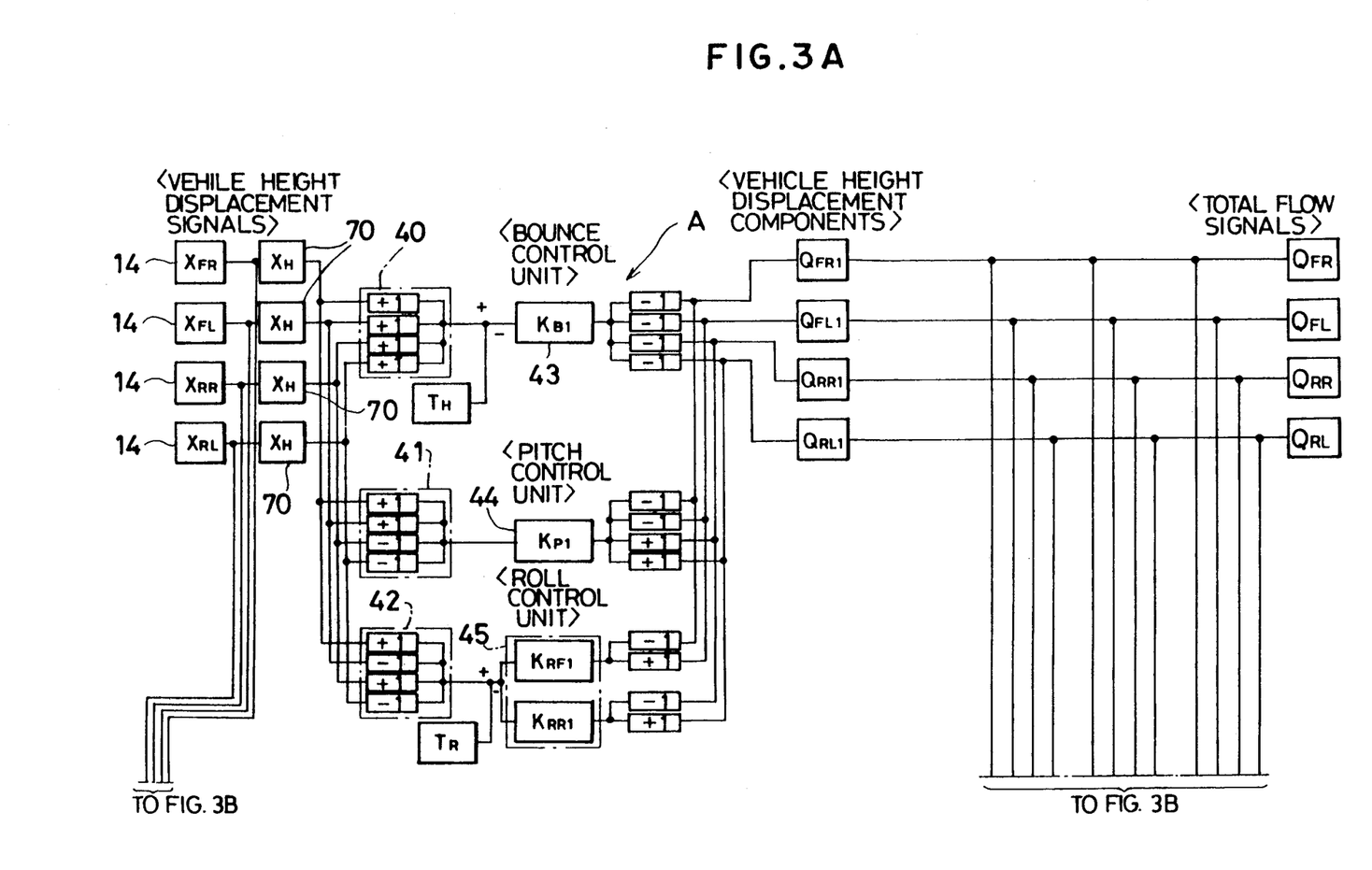
FIGS. 3A through 3D are block diagrams illustrating control of suspension characteristics by a controller.

First, in the control system A, numeral 40 designates a bounce component arithmetic unit which computes the vehicle bounce components by summing not only the outputs $X_{FR}$, $X_{FL}$ of the right and left front wheels 2F but also the outputs $X_{RR}$, $X_{RL}$ of the right and left rear wheels 2R from the vehicle height sensors 14, 14, 14, 14. Numeral 41 designates a pitch component arithmetic unit which computes the vehicle pitch components by subtracting the summed outputs $X_{RR}$, $X_{RL}$ of the right and left rear wheels 2R from summed outputs $X_{FR}$, $X_{FL}$ of the right and left front wheels 2F. Numeral 42 designates a roll component arithmetic unit which computes vehicle roll components by summing the difference $X_{FR}-X_{FL}$ of the outputs of the right and left front wheels 2F and the difference $X_{RR}-X_{RL}$ of the outputs of the right and left rear wheels 2R. Numeral 43 designates a bounce control unit to which is input the vehicle bounce component computed in the bounce component arithmetic unit 40 and a desired average vehicle height $T_H$, and which computes controlled variables of the proportional flow control valves 9, 9, 9, 9 based on a gain coefficient $K_{B1}$ under bounce control. Numeral 44 designates a pitch control unit to which is input vehicle pitch components computed in the pitch component arithmetic unit 41 and which computes controlled variables of the proportional flow control valves 9, 9, 9, 9 based on a gain coefficient $K_{PI}$ under pitch control. Numeral 45 designates a roll control unit to which is input vehicle roll components computed in the roll component arithmetic unit 42 and a desired roll displacement $T_R$, and which computes controlled variables of the proportional flow control valves 9, 9, 9, 9 based on gain coefficients $K_{RF1}$, $K_{RR1}$ under roll control so as to level vehicle height corresponding to the desired roll displacement $T_R$.

For the purpose of controlling vehicle height to the desired value, the controlled variables computed in the above mentioned control units 43, 44, 45 are reversed with respect to the signs of the vehicle height displacement signals of vehicle height sensors 14, 14, 14, 14. After that, each controlled bounce, pitch and roll variable for the vehicle wheels are added and flow signals $Q_{FR1}$, $Q_{FL1}$, $Q_{RR1}$, $Q_{RL1}$ of corresponding proportional flow control valves 9, 9, 9, 9 are obtained in the control system A.

Between the vehicle height sensors 14, 14, 14, 14 and the arithmetic units 40, 41, 42 are provided dead zone devices 70, 70, 70, 70, which output their vehicle height displacement signals $X_{FR}$, $X_{FL}$, $X_{RR}$, $X_{RL}$ only when the vehicle height displacement signals $X_{FR}$, $X_{FL}$, $X_{RR}$, $X_{RL}$ from the vehicle height sensors 14, 14, 14, 14 exceed the preset dead zone $X_H$.

Figure 3B:
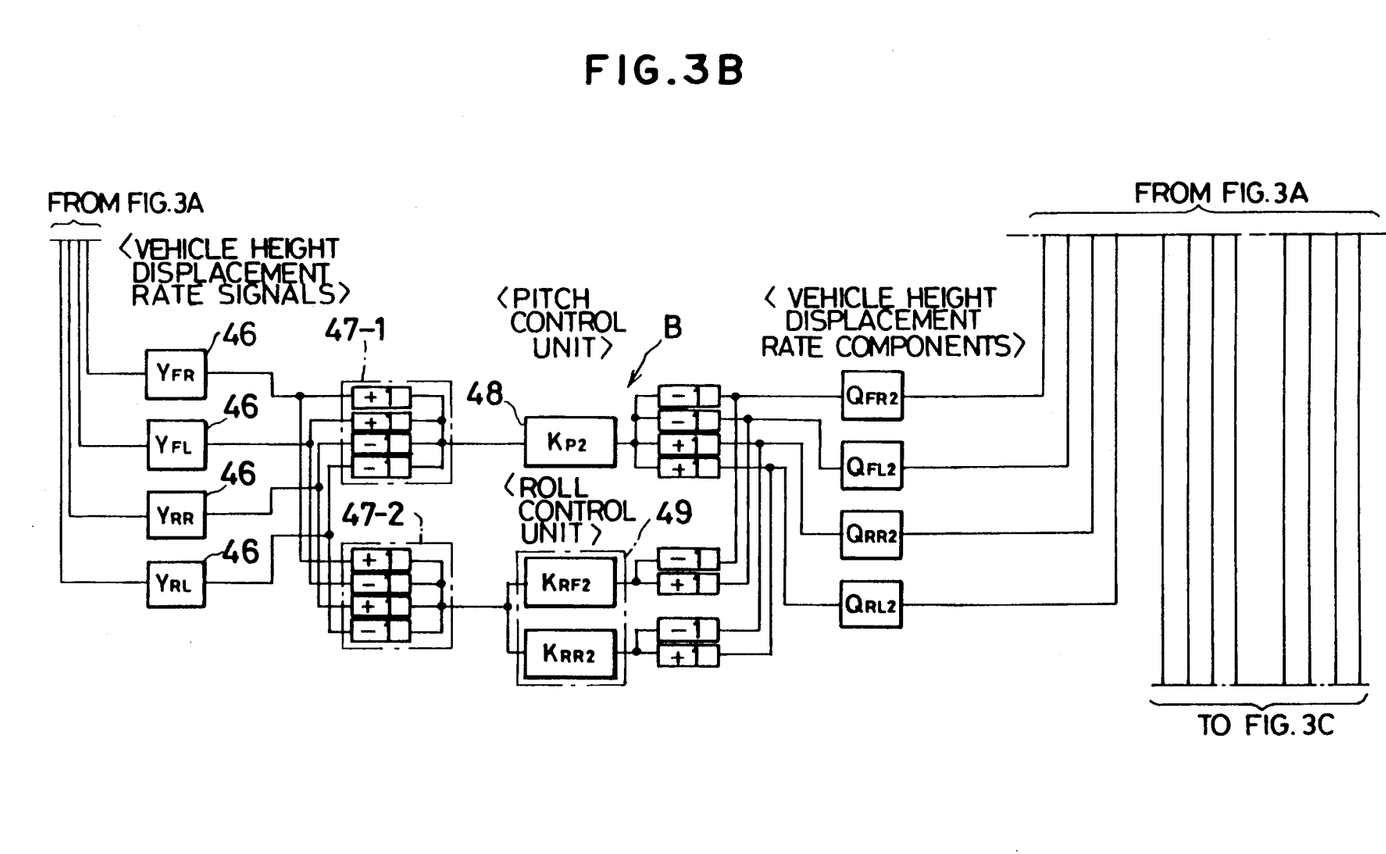

Next in the control system B, vehicle height displacement signals $X_{FR}$, $X_{FL}$, $X_{RR}$, $X_{RL}$ from the vehicle height sensors 14, 14, 14, 14, are input to differentiators 46, 46, 46, 46, by which differential components of the vehicle height displacement signals $X_{FR}$, $X_{FL}$, $X_{RR}$, $X_{RL}$, or vehicle height displacement rate signals $Y_{FR}$, $Y_{FL}$, $Y_{RR}$, $Y_{RL}$ are obtained.

Here, the vehicle height displacement rate is obtained by the following equation.

$$Y = (X_n - X_{n-1})/T$$

$X_n$: vehicle height at time $t$ $X_{n-1}$: vehicle height at time $t-1$ $T$: sampling time Numeral 47-1 designates a pitch component arithmetic unit which computes the vehicle pitch elements by subtracting the summation of the outputs $Y_{RR}$, $Y_{RL}$ of the right and left rear wheels 2R from summation of the outputs $Y_{FR}$, $Y_{FL}$ of the right and left front wheels 2F. Numeral 47-2 designates a roll element arithmetic unit which computes vehicle roll components by summing difference $Y_{FR}-Y_{FL}$ of the outputs of the right and left front wheels 2F and the difference $Y_{RR}-Y_{RL}$ of the outputs of the right and left rear wheels 2R.

Further, numeral 48 designates a pitch control unit to which is input the vehicle pitch component computed in the pitch component arithmetic unit 47-1, and which computes controlled variables for the proportional flow control valves 9, 9, 9, 9 based on a gain coefficient $K_{P2}$ for changing the vehicle height displacement change rate gain under pitch control. Numeral 49 designates a roll control unit to which is input vehicle roll components computed in the roll component arithmetic unit 47-2, and which computes controlled variables for the proportional flow control valves 9, 9, 9, 9 based on gain coefficients $K_{RF2}$, $K_{RR2}$ for changing the vehicle height displacement change rate gain under roll control.

Thus, each controlled variable computed in the above mentioned control units 48, 49 is reversed with respect to the signs of vehicle height displacement rate signals of the differentiators 46, 46, 46, 46. After that, the controlled pitch and roll variables of the vehicle wheels are added, and flow signals $Q_{FR2}$, $Q_{FL2}$, $Q_{RR2}$, $Q_{RL2}$ for the corresponding proportional flow control valves 9, 9, 9, 9 are obtained in the control system B.

Figure 3C:
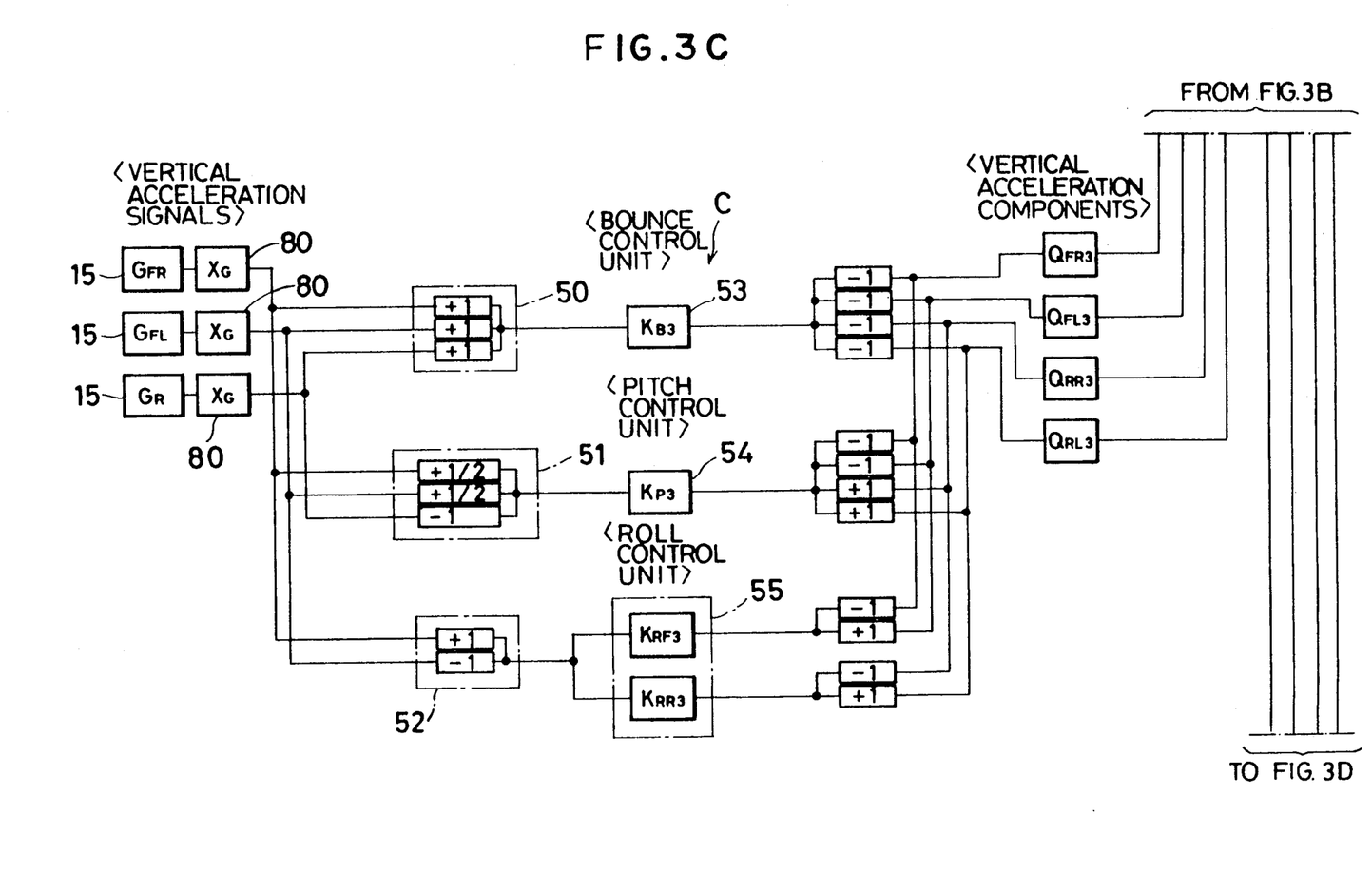

Next in the control system C, numeral 50 designates a bounce component arithmetic unit which computes the vehicle bounce components by summing the outputs $G_{FR}$, $G_{FL}$, $G_R$ of the three vertical acceleration sensors 15, 15, 15. Numeral 51 designates a pitch component arithmetic unit which computes vehicle pitch components by subtracting the output $G_R$ of the rear wheel 2R from the summation of each half-value of outputs $G_{FR}$, $G_{FL}$ of the right and left front wheels 2F in the three vertical acceleration sensors 15, 15, 15. Numeral 52 designates a roll component arithmetic unit which computes vehicle roll components by subtracting the output $G_{FL}$ of the left front wheel from output $G_{FR}$ of the right front wheel.

Further, numeral 53 designates a bounce control unit to which is input vehicle bounce components computed in the bounce component arithmetic unit 50, and which computes controlled variables for the proportional flow control valves 9, 9, 9, 9 of the wheels based on again coefficient $K_{B3}$ under bounce control. Numeral 54 designates a pitch control unit to which is input vehicle pitch components computed in the pitch component arithmetic unit 51, and which computes controlled variables for the proportional flow control valves 9, 9, 9 9 based on a gain coefficient $K_{P3}$ under pitch control. Numeral 55 designates a roll control unit to which is input vehicle roll components computed in the roll component arithmetic unit 52, and which computes controlled variables for the proportional flow control valves 9, 9, 9, 9 based on gain coefficients $K_{RF3}$, $K_{RR3}$ under roll control.

For the purpose of suppressing vehicle vertical vibration by the bounce components, pitch components and roll components, controlled variables in above mentioned control units 53, 54, 55 are reversed in sign in every wheel, and after that, each controlled bounce, pitch and roll variable in each vehicle wheel is added and flow signals $Q_{FR3}$, $Q_{FL3}$, $Q_{RR3}$, $Q_{RL3}$ for corresponding proportional flow control valves 9, 9, 9, 9 are obtained in the control system C.

Between the vertical acceleration sensors 15, 15, 15 and the arithmetic units 50, 51, 52 are provided dead zone devices 80, 80, 80, which output their vertical acceleration signals $G_{FR}$, $G_{FL}$, $G_R$ only when the vertical acceleration signals $G_{FR}$, $G_{FL}$, $G_R$ from the vertical acceleration sensors 15, 15, 15 exceed preset dead zone $X_G$.

Figure 3D:
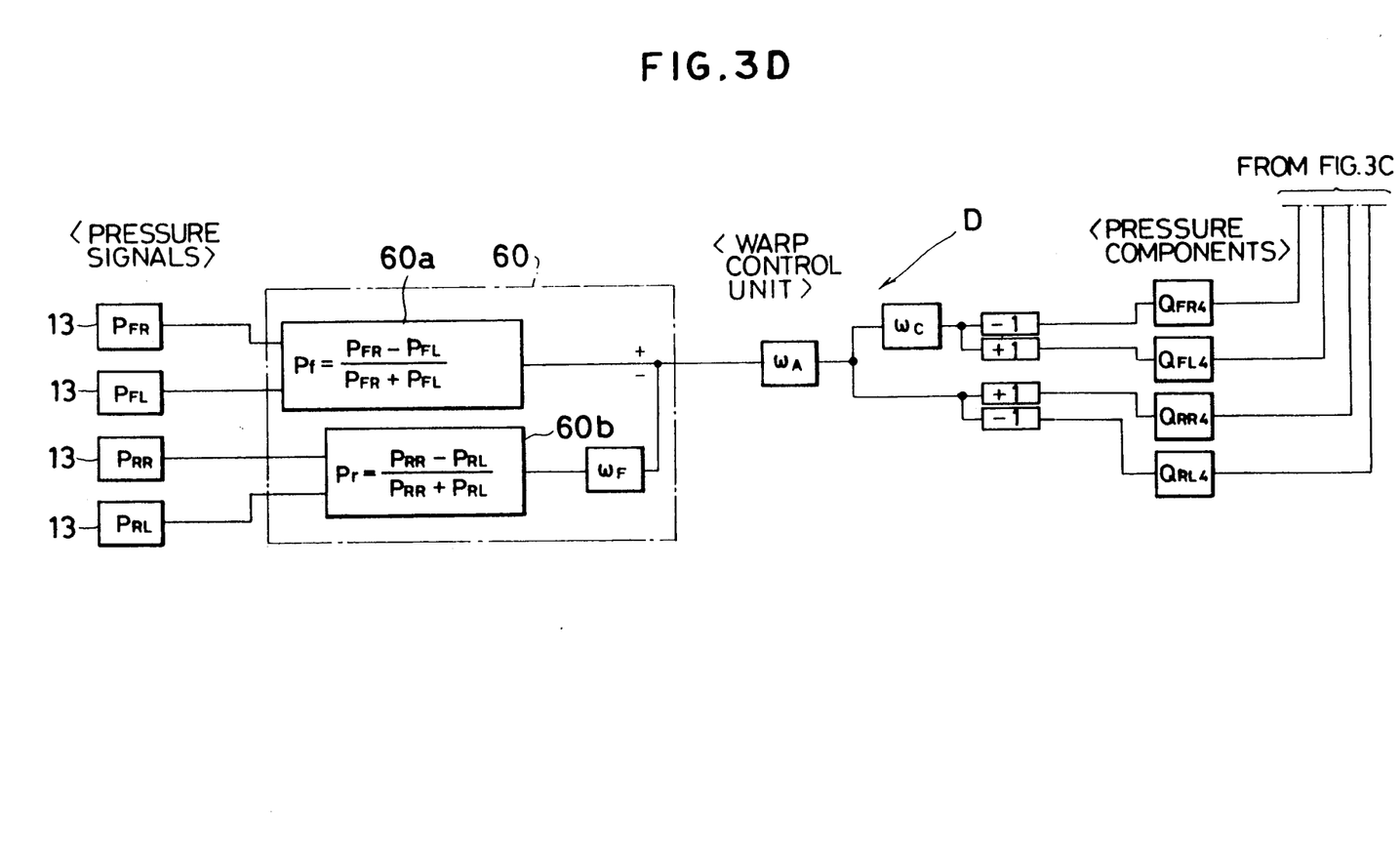

Next in the control system D, a warp control unit 60 includes a fluid pressure ratio arithmetic unit 60a of the front wheel to which is input fluid pressure signals $P_{FR}$, $P_{FL}$ of the fluid pressure sensors 13, 13 of the two front wheels and computes the ratio $(R_{FR} - P_{FL})/(P_{FR} + P_{FL})$ of the right and left front wheel pressure difference $(P_{FR} - P_{FL})$ to the front wheel total fluid pressure $(P_{FR} + P_{FL})$, and a fluid pressure ratio arithmetic unit 60b of the rear wheel which similarily computes the fluid pressure ratio $(P_{RR} - P_{RL})/(P_{RR} + P_{RL})$ of the rear wheel. Then after the fluid pressure ratio of the rear wheel is multiplied by a gain coefficient $W_F$, the multiplied valve is subtracted from the fluid pressure ratio of the front wheel, thus the subtracted valve is multiplied by a gain coefficient $W_A$ and moreover is multiplied by a gain coefficient $W_C$ in the front wheel. After that controlled variables for the wheels are reversed in sign for the purpose of being equalized between right and left wheels, so that flow signals $Q_{FR4}$, $Q_{RL4}$, $Q_{RR4}$, $Q_{RL4}$ of corresponding proportional flow control valves 9, 9, 9, 9 are obtained.

Thus, finally total flow signals $Q_{FR}$, $Q_{FL}$, $Q_{RR}$, $Q_{RL}$ are obtained by summing vehicle height displacement components $Q_{FR1}$, $Q_{FL1}$, $Q_{RR1}$, $Q_{RL1}$, vehicle height displacement rate components $Q_{FR2}$, $Q_{FL2}$, $Q_{RR2}$, $Q_{RL2}$, vertical acceleration components $Q_{FR3}$, $Q_{FL3}$, $Q_{RR3}$, $Q_{RL3}$ and pressure components $Q_{FR4}$, $Q_{FL4}$, $Q_{RR4}$, $Q_{RL4}$ finally.

Next, in the vehicle suspension system in accordance with the embodiment of the invention, the dead zone $X_H$ is changed in the control system A shown in FIG. 3, according to predetermined conditions, which are described in detail below.

Figure 4:
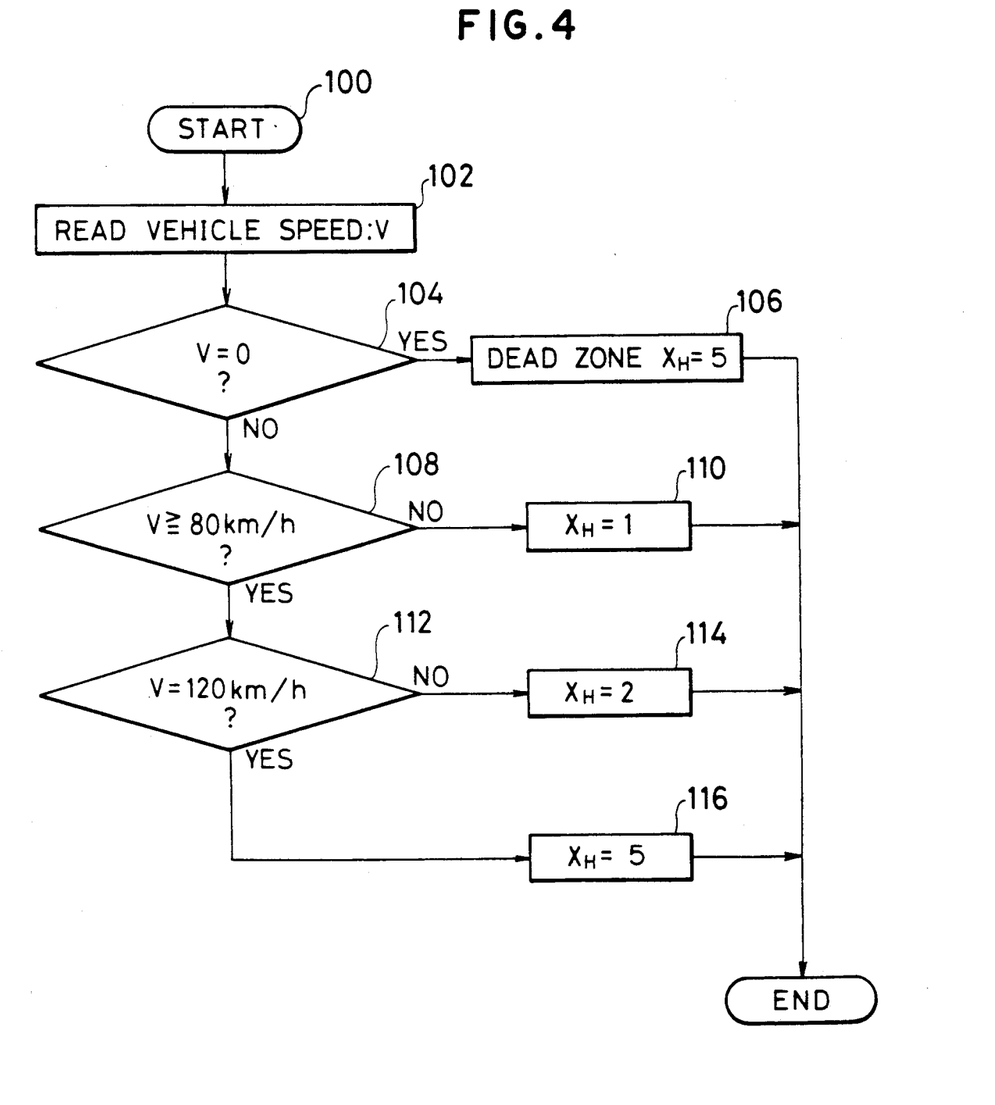
FIGS. 4 and 5 are, respectively, a first flow chart and a second flow chart of the operation of a vehicle suspension system according to an embodiment of the invention.

First, FIG. 4 shows a first flow chart of a control for the vehicle suspension system in accordance with the present invention.

In FIG. 4, the procedure starts in step 100. The vehicle speed is read in step 102. When it is found in step 104 that the vehicle speed V is zero (when the vehicle is parked), the dead zone $X_H$ is set a value of 5 in step 106.

Thus, when the vehicle is parked, the dead zone $X_H$ is increased to reduce the sensitivity of the vehicle height control so that use of the frequency of the hydraulic fluid in the accumulator 22 (FIG. 2 can be reduced.

When the vehicle is parked, the engine is stopped. Thus, the oil pump 8 is also stopped so that there is no hydraulic fluid supply for the accumulator 22.

On the other hand, if it is judged in the step 104 that the vehicle speed is not zero, the procedure goes to step 108. In step 108, if the vehicle speed V is less than 80 km/h(low speed condition of the vehicle), the dead zone $X_H$ is set at a value of 1 in step 110. That is, when the vehicle is in a low speed condition, the warp of the vehicle does not affect the steering property of the vehicle seriously. In view of this, the dead zone $X_H$ is set at a relatively small value. As a result, the vehicle height control is emphasized to obtain the target vehicle height displacement.

When it is judged in step 108 that the vehicle speed is not less than 80 km/h, the procedure goes to step 112. In step 112, a judgment is made as to whether or not the vehicle speed is less than 120 km/h. If the judgment in step 112 is yes, or if the vehicle speed is less than 120 km/h, the dead zone $X_H$ is set at a value of 2 in step 114. On the other hand, if it is judged in step 112 that the vehicle speed is not less than 120 km/h, the dead zone $X_H$ is set at a value of 5 is step 116. Thus, the dead zone $X_H$ is increased in a high vehicle speed condition so that the warp control is emphasized compared with the vehicle height displacement control. As a result, the steering property of the suspension system is improved in the high vehicle speed condition.

Figure 5:
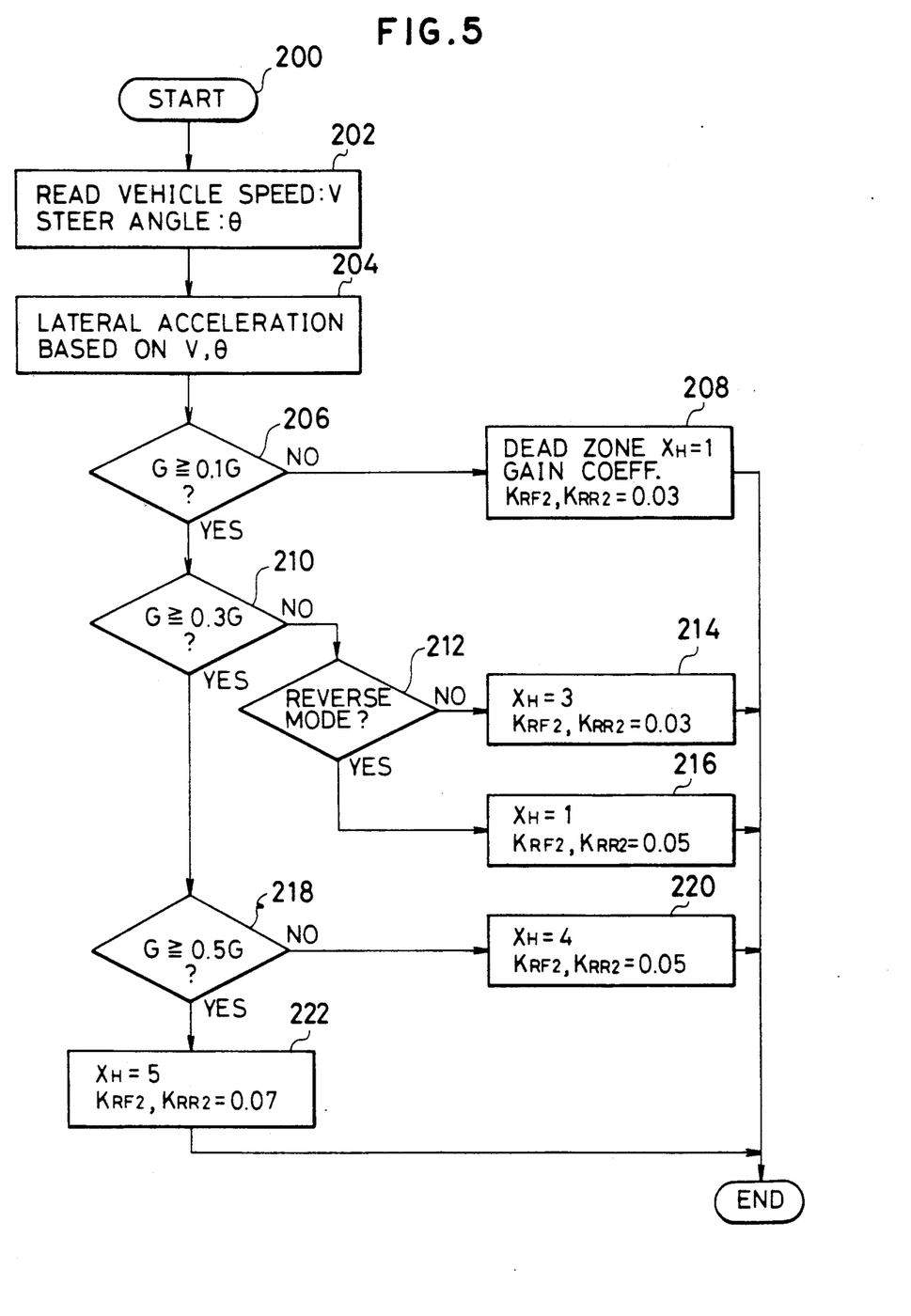

Referring to FIG. 5, there is shown a second flow chart of a control of the vehicle suspension system in accordance with the present invenion.

In FIG. 5, the control starts in step 200. In step 202, the vehicle speed V and the steering angle $\theta$ are read. In step 204, the lateral acceleration is computed based on the vehicle speed V and the steering angle $\theta$. When the lateral acceleration G is less than 0.1G, it is judged that the vehicle is running on a straight path (straight running). In this case, the dead zone $X_H$ is set at a value of 1 in step 208. That is, when the vehicle is in a low speed condition, the warp of the vehicle does not affect the steering property of the vehicle seriously In view of this, the dead zone $X_H$ is set at a relatively small value. As a result, the vehicle height control is emphasized to obtain the target vehicle height displacement.

In step 206, when the lateral acceleration G is not less than 0.1G, it is judged that the vehicle is in a steering operation (steering condition). In this case, the procedure goes to step 210. In step 210, A judgment is made as to whether or not the lateral acceleration G is greater than or equal to 0.3G. If the judgment is no or if the lateral acceleration G is less than 0.3G, the procedure goes to step 212. Floss step 212, when the vehicle is not in a reverse roll mode, step 214 is carried out and the dead zone $X_H$ is increased to a value of 3. If it is judged in the step 212 that the vehicle is in the reverse roll mode, step 216 is carried out and the dead zone $X_H$ is set at the value of 1. In other words, the warp control is emphasized by increasing the dead zone $X_H$ in a condition other than the reverse roll mode to improve the steering property. On the other hand, the vehicle height displacement control is emphasized by providing the dead zone $X_H$ with the relatively small value of 1 to achive the reverse roll mode.

In step 210, if it is judged that the lateral acceleration G is not less than 0.3G, the procedure goes to step 218 and a judgment is made as to whether or not the lateral acceleration is greater than or equal to 0.5G. If the judgment is no or if the leteral acceleration is less than 0.5G, step 220 is carried out and the dead zone $X_H$ is set at a value of 4. On the other hand, if the lateral acceleration is not less than 0.5G, step 222 is carried out and the dead zone $X_H$ is set at a value of 5. Thus, the dead zone $X_H$ is increased as the lateral acceleration G is increased so that the warp control is emphasized compared with the vehicle height displacement control to thereby improve the steering property of the vehicle.

In steps 208, 214, 220 and 222, the dead zone $X_H$ is set at values of 1, 3, 4 and 5, respectively, in a manner such that the value of $X_H$ is increased as the lateral acceleration is increased. In the same steps 208, 214, 220 and 222, the gain coefficients $K_{RR2}$ and $K_{RF2}$ are set at values 0.03, 0.03, 0.05 and 0.07 respectively.

Accordingly, the gain coefficients $K_{RF2}$ and $K_{RR2}$ are increased and height control sensitivity is reduced as the dead zone $X_H$ is increased and sensitivity of the vehicle height displacement change rate is increased. In other words, although the vehicle height displacement sensitivity is reduced, the vehicle height displacement change rate sensitivity is improved to accomplish a responsive control for the vehicle attitude.

In the above control, the vehicle height displacement gain coefficients $K_{B1}$, $K_{P1}$, $K_{RF1}$ and $K_{RR1}$ can be employed instead of the dead zone $X_H$. In this case, the change in the vehicle height displacement sensivility corresponds to that of the vehicle height displacement gain coefficient $K_{B1}$, $K_{P1}$, $K_{RF1}$ and $K_{RR1}$.

What is claimed is:

1. A vehicle suspension system comprising:
   a cylinder device provided between a vehicle body member and a vehicle wheel member for the vehicle body member in which suspension characteristics are changed by controlling a hydraulic fluid supply for the cylinder device,
   vehicle height displacement detecting means for detecting a vehicle height displacement,
   vehicle height control means for receiving a signal from the vehicle height displacement detecting means to control the hydraulic fluid supply for the cylinder device to thereby obtain a target vehicle height displacement in accordance with a height control sensitivity,
   pressure detecting means for detecting a hydraulic pressure of the cylinder device,
   warp control means for receiving a signal from the pressure detecting means to control the hydraulic fluid supply for the cylinder device to thereby suppress a warping of the vehicle body member,
   sensitivity change means for reducing the height control sensitivity under a predetermined condition to reduce an influence of the vehicle height control means on control of the hydraulic fluid supply for the cylinder in comparison with the warp control means.

2. A vehicle suspension system according to claim 1 wherein said sensitivity change means reduces the height control sensitivity as a vehicle speed is increased.

3. A vehicle suspension system according to claim 1 wherein said sensitivity change means reduces the height control sensitivity as a lateral acceleration is increased.

4. A vehicle suspension system according to claim 1 wherein said sensitivity change means reduces the height control sensitivity when the vehicle speed is zero.

5. A vehicle suspension system according to claim 1 wherein a sensitivity related to a vehicle height displacement change rate is increased as the sensitivity change means changes reduces the height control sensitivity.

6. A vehicle suspension system according to claim 1, wherein a dead zone for the vehicle height control means is increased under the predetermined condition.

* * * * *